United States Patent
Gweon et al.

(10) Patent No.: US 10,970,633 B1
(45) Date of Patent: Apr. 6, 2021

(54) METHOD FOR OPTIMIZING ON-DEVICE NEURAL NETWORK MODEL BY USING SUB-KERNEL SEARCHING MODULE AND DEVICE USING THE SAME

(71) Applicant: Stradvision, Inc., Pohang-si (KR)

(72) Inventors: Sung An Gweon, Seoul (KR);
Yongjoong Kim, Pohang-si (KR);
Bongnam Kang, Pohang-si (KR);
Hongmo Je, Pohang-si (KR)

(73) Assignee: STRADVISION, INC., Gyeongsangbuk-do (KR)

( * ) Notice: Subject to any disclaimer, the term of this patent is extended or adjusted under 35 U.S.C. 154(b) by 0 days.

(21) Appl. No.: 17/135,301

(22) Filed: Dec. 28, 2020

Related U.S. Application Data

(60) Provisional application No. 63/024,025, filed on May 13, 2020.

(51) Int. Cl.
| *G06N 3/02* | (2006.01) |
| *G06N 3/08* | (2006.01) |
| *G06K 9/62* | (2006.01) |
| *G06N 20/10* | (2019.01) |

(52) U.S. Cl.
CPC ........... *G06N 3/084* (2013.01); *G06K 9/6262* (2013.01); *G06N 20/10* (2019.01)

(58) Field of Classification Search
CPC ....... G06N 3/084; G06N 20/10; G06K 9/6262
See application file for complete search history.

(56) References Cited

U.S. PATENT DOCUMENTS

| 2019/0122101 | A1* | 4/2019 | Lei | G06F 17/16 |
| 2020/0021865 | A1* | 1/2020 | Topiwala | H04N 21/23418 |
| 2020/0302269 | A1* | 9/2020 | Ovtcharov | G06N 3/0445 |
| 2020/0302272 | A1* | 9/2020 | Singh | G06N 3/0472 |
| 2021/0019531 | A1* | 1/2021 | Long | G06K 9/00718 |

* cited by examiner

*Primary Examiner* — David F Dunphy
(74) *Attorney, Agent, or Firm* — Holzer Patel Drennan

(57) ABSTRACT

A method for optimizing an on-device neural network model by using a Sub-kernel Searching Module is provided. The method includes steps of a learning device (a) if a Big Neural Network Model having a capacity capable of performing a targeted task by using a maximal computing power of an edge device has been trained to generate a first inference result on an input data, allowing the Sub-kernel Searching Module to identify constraint and a state vector corresponding to the training data, to generate architecture information on a specific sub-kernel suitable for performing the targeted task on the training data, (b) optimizing the Big Neural Network Model according to the architecture information to generate a specific Small Neural Network Model for generating a second inference result on the training data, and (c) training the Sub-kernel Searching Module by using the first and the second inference result.

24 Claims, 8 Drawing Sheets

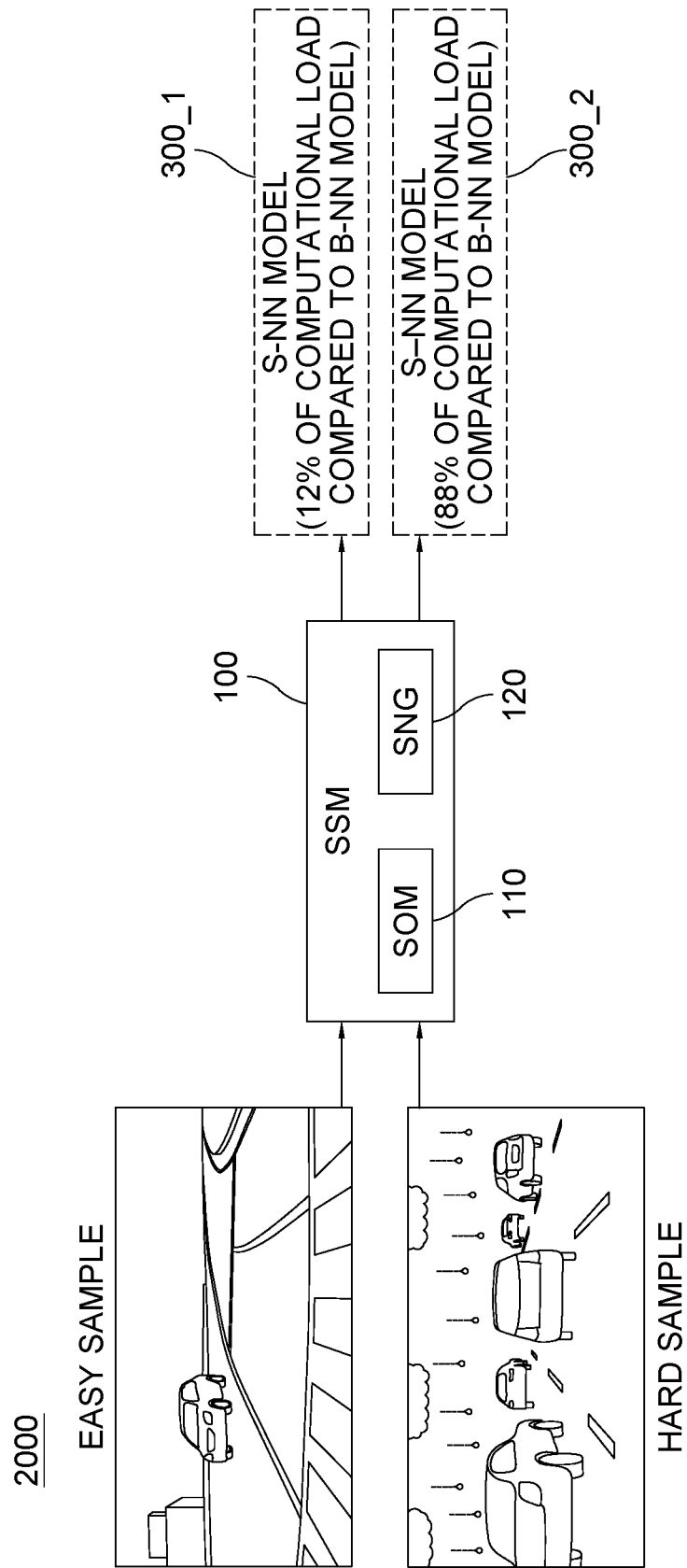

METHOD FOR OPTIMIZING ON-DEVICE NEURAL NETWORK MODEL BY USING SUB-KERNEL SEARCHING MODULE AND DEVICE USING THE SAME

CROSS REFERENCE OF RELATED APPLICATION

This present application claims the benefit of the earlier filing date of U.S. provisional patent application No. 63/024,025, filed May 13, 2020, the entire contents of which being incorporated herein by reference.

FIELD OF THE DISCLOSURE

The present disclosure relates to a method for optimizing an on-device neural network model and a device using the same; and more particularly, to the method for training a Sub-kernel Searching Module (SSM) used for optimizing the on-device neural network model and the method for optimizing the on-device neural network model by using the Sub-kernel Searching Module and a learning device and an optimizing device using the same.

BACKGROUND OF THE DISCLOSURE

A device using image classification have difficulties in identifying at least some of input images due to various factors such as brightness, shaking, and noise of the input images.

Therefore, deep learning technology is adopted to improve an accuracy of the image classification.

However, in order to enhance the accuracy of the image classification, continuous optimization of a neural network model is required, and accordingly, various technologies for efficiently updating the neural network model have been developed.

To attain this end, conventionally, human experts manually design a deep learning network model but recently, methods such as Neural Architecture Search (NAS) in which neural network (AI) directly designs the neural network model applied to the device are developed.

As one example, by referring to FIG. 1, a conventional NAS designs a child neural network model by generating configuration strings containing architecture information on the neural network model, which is applied or to be applied on the device, through using a Recurrent Neural Network (RNN). Thereafter, a performance of the child neural network model is measured by using a validation set, and accuracy values R obtained as results may be used as rewards in reinforcement learning to update parameters of the child neural network model. Apart from this, techniques such as gradient descent optimization and evolutionary search are also adopted to achieve an optimal network performance.

In addition, an online learning is another conventional neural network optimization technology as schematically illustrated in FIG. 2. In this technology, processes of performing inference online on the images with an existing neural network model and subsequently updating or retraining the existing neural network model according to the result of the inference are adopted.

An optimization of a neural network model architecture by using a neural network demonstrated as such is useful for edge devices mounted on autonomous maneuvering machines, such as autonomous vehicles, unmanned airplanes, robots, etc., that require the deep learning technology, but conventional methods to use the neural network model for intended purposes by mounting the neural network model on the edge devices have following problems.

First, a model capacity of the conventional neural network model mounted on the edge devices is restricted by a relatively small amount of computational load and a relatively small number of parameters allowed by the edge device.

In addition, although a model capacity required for detecting and classifying images may differ according to difficulty levels of the images, the conventional neural network model mounted on the edge device is only capable of applying the same amount of the computational load and the same number of the parameters to all the images, resulting in a failure to maintain performance levels of detection and classification throughout various difficulty levels of the images.

Adding to this, since it is difficult for the conventional neural network model mounted on the edge device to search for hard samples without intervention of human experts, it takes a lot of manpower and cost to improve a performance level of the conventional neural network model.

Therefore, an enhanced method for solving the aforementioned problems is required.

SUMMARY OF THE DISCLOSURE

It is an object of the present disclosure to solve all the aforementioned problems.

It is another object of the present disclosure to perform an optimization of a neural network model mounted on an edge device without using an external server.

It is still another object of the present disclosure to optimize the neural network model mounted on the edge device by generating a sub-architecture of the neural network model according to computing power and surrounding environment of the edge device.

It is still yet another object of the present disclosure to reduce sizes of weights and the number of computations (mac/flops) read during inference by applying a computational load optimized according to a difficulty level of an inputted data.

It is still yet another object of the present disclosure to improve performance levels of each sub-architecture of the neural network model by continuously collecting hard samples for each level of computational load corresponding to each sub-architecture.

In accordance with one aspect of the present disclosure, there is provided a method for optimizing an on-device neural network model by using a Sub-kernel Searching Module (SSM), including steps of: (a) a learning device, on condition that a Big Neural Network Model (B-NN Model) having a maximal capacity capable of performing a targeted task by using a maximal computing power allowed by an edge device on which a neural network model is to be mounted has been trained to generate a first inference result on an input data fed thereinto, if a training data is acquired, performing or supporting another device to perform a process of inputting the training data into a Sub-kernel Searching Module (SSM), to thereby allow the Sub-kernel Searching Module to (i) identify at least one constraint corresponding to the training data wherein the constraint is imposed on at least part of a computational load, parameters, a latency, an accuracy, and flops, (ii) generate a state vector corresponding to the training data wherein the state vector includes information on at least one of a degree of complexity of the training data and a degree of sharpness of the training data, and (iii) generate architecture information on a specific sub-kernel having a minimal kernel size and a minimal number of channels suitable for performing the targeted task on the training data having the state vector under the constraint, wherein the specific sub-kernel is a subset of a super kernel corresponding to the maximal capacity of the Big Neural Network Model and is comprised of a kernel size equal to or less than that of the super kernel and the number of the channels in the kernel equal to or less than that in the super kernel; (b) the learning device performing or supporting another device to perform (i) a process of optimizing the Big Neural Network Model by referring to the architecture information on the specific sub-kernel, to thereby generate a specific Small Neural Network Model (S-NN Model) having the architecture information on the specific sub-kernel, from the Big Neural Network Model and (ii) a process of allowing the specific Small Neural Network Model to generate a second inference result on the training data; and (c) the learning device performing or supporting another device to perform a process of calculating one or more first losses by referring to the first inference result and the second inference result and a process of training the Sub-kernel Searching Module by using the first losses.

As one example, at the step of (a), the learning device performs or supports another device to perform a process of allowing the Sub-kernel Searching Module to (i) generate scene features corresponding to the training data and then generate the state vector corresponding to the scene features, through a Scene Overviewing Module (SOM) and (ii) generate the architecture information on the specific sub-kernel having the minimal kernel size and the minimal number of the channels suitable for performing the targeted task on the training data having the state vector under the constraint, through a Sub-kernel Network Generator (SNG).

As another example, wherein the learning device performs or supports another device to perform (i) a process of training the Scene Overviewing Module and the Sub-kernel Network Generator under the constraint through backpropagation by using the first losses such that the first losses are minimized and (ii) a process of calculating one or more second losses by referring to the state vector and its corresponding ground truth and a process of training the Scene Overviewing Module by using the second losses such that the second losses are minimized.

As another example, the Scene Overviewing Module is comprised of a CNN (Convolutional Neural Network) and wherein the Sub-kernel Network Generator is comprised of an RNN (Recurrent Neural Network), and the learning device performs or supports another device to perform a process of training the Scene Overviewing Module and the Sub-kernel Network Generator separately or simultaneously.

As another example, wherein the learning device performs or supports another device to perform a process of allowing the CNN in the Scene Overviewing Module to apply at least one convolution operation, at least one pooling operation, and at least one fully-connected operation to the training data, and thus to generate the scene features corresponding to the training data.

As another example, at the step of (b), the learning device performs or supports another device to perform a process of optimizing the Big Neural Network Model by adjusting at least one of a kernel height, a kernel width, and the number of channels of the super kernel of the Big Neural Network Model in accordance with the architecture information on the specific sub-kernel, to thereby generate the specific Small Neural Network Model having the architecture information on the specific sub-kernel.

As another example, if a difference between the first inference result and the second inference result is determined as higher than a predetermined threshold, the learning device performs or supports another device to perform a process of transmitting the training data and the architecture information on the specific Small Neural Network Model to the server, to thereby allow the server to set the training data as a hard sample to be used for the specific Small Neural Network Model and to add the hard sample to a training database.

In accordance with another aspect of the present disclosure, there is provided a method for optimizing an on-device neural network model by using a Sub-kernel Searching Module (SSM), including steps of: (a) on condition that (i) a Big Neural Network Model (B-NN Model), having a maximal capacity capable of performing a targeted task by using a maximal computing power allowed by an edge device on which a neural network model is to be mounted, has been trained to generate a first inference result on an input data fed thereinto and then a learning device has performed a process of inputting a training data into a Sub-kernel Searching Module (SSM), to thereby allow the Sub-kernel Searching Module to (i-1) identify at least one constraint for training corresponding to the training data wherein the constraint for training is imposed on at least part of a computational load, parameters, a latency, an accuracy, and flops, (i-2) generate a state vector for training corresponding to the training data wherein the state vector for training includes information on at least one of a degree of complexity of the training data and a degree of sharpness of the training data, and (i-3) generate architecture information for training on a specific sub-kernel for training having a minimal kernel size and a minimal number of channels suitable for performing the targeted task on the training data having the state vector for training under the constraint, wherein the specific sub-kernel for training is a subset of a super kernel corresponding to the maximal capacity of the Big Neural Network Model and is comprised of a kernel size equal to or less than that of the super kernel and the number of the channels in the kernel equal to or less than that in the super kernel, (ii) (ii-1) optimizing the Big Neural Network Model by referring to the architecture information for training on the specific sub-kernel for training, to thereby generate a specific Small Neural Network Model (S-NN Model) for training having the architecture information for training on the specific sub-kernel for training, from the Big Neural Network Model and (ii-2) allowing the specific Small Neural Network Model for training to generate a second inference result on the training data, and (iii) calculating one or more first losses by referring to the first inference result and the second inference result and training the Sub-kernel Searching Module by using the first losses, an optimizing device, if a test data is acquired, performing or supporting another device to perform a process of inputting the test data into the Sub-kernel Searching Module (SSM), to thereby allow the Sub-kernel Searching Module to (i) identify at least one constraint for testing corresponding to the test data wherein the constraint for testing is imposed on at least part of a computational load, parameters, a latency, an accuracy, and flops, (ii) generate a state vector for testing corresponding to the test data wherein the state vector for testing includes information on at least one of a degree of complexity of the test data and a degree of sharpness of the test data, and (iii) generate architecture information for testing on a specific sub-kernel for testing having a minimal kernel size and a minimal number of channels suitable for performing the targeted task on the test data having the state vector for testing under the constraint for testing, wherein the specific sub-kernel for testing is a subset of the super kernel corresponding to the maximal capacity of the Big Neural Network Model and is comprised of a kernel size equal to or less than that of the super kernel and the number of the channels in the kernel equal to or less than that in the super kernel; and (b) the optimizing device performing or supporting another device to perform a process of (i) optimizing the Big Neural Network Model by referring to the architecture information for testing on the specific sub-kernel for testing, to thereby generate a specific Small Neural Network Model (S-NN Model) for testing having the architecture information for testing on the specific sub-kernel for testing, from the Big Neural Network Model and (ii) allowing the specific Small Neural Network Model for testing to generate a third inference result on the test data.

As one example, at the step of (a), the optimizing device performs or supports another device to perform a process of allowing the Sub-kernel Searching Module to (i) generate scene features for testing corresponding to the test data and then generate the state vector for testing corresponding to the scene features for testing, through the Scene Overviewing Module (SOM) and (ii) generate the architecture information for testing on the specific sub-kernel for testing having the minimal kernel size and the minimal number of the channels suitable for performing the targeted task on the test data having the state vector for testing under the constraint for testing, through the Sub-kernel Network Generator (SNG).

As another example, the Scene Overviewing Module is comprised of a CNN (Convolutional Neural Network) and wherein the Sub-kernel Network Generator is comprised of an RNN (Recurrent Neural Network).

As another example, the optimizing device performs or supports another device to perform a process of allowing the CNN in the Scene Overviewing Module to apply at least one convolution operation, at least one pooling operation, and at least one fully-connected operation to the test data, and thus to generate the scene features for testing corresponding to the test data.

As another example, at the step of (b), the optimizing device performs or supports another device to perform a process of optimizing the Big Neural Network Model by adjusting at least one of a kernel height, a kernel width, and the number of channels of the super kernel of the Big Neural Network Model in accordance with the architecture information for testing on the specific sub-kernel for testing, to thereby generate the specific Small Neural Network Model for testing having the architecture information for testing on the specific sub-kernel for testing.

In accordance with still another aspect of the present disclosure, there is provided a learning device for including: at least one memory that stores instructions; and at least one processor configured to execute the instructions to perform or support another device to perform: (I) on condition that a Big Neural Network Model (B-NN Model) having a maximal capacity capable of performing a targeted task by using a maximal computing power allowed by an edge device on which a neural network model is to be mounted has been trained to generate a first inference result on an input data fed thereinto, if a training data is acquired, a process of inputting the training data into a Sub-kernel Searching Module (SSM), to thereby allow the Sub-kernel Searching Module to (i) identify at least one constraint corresponding to the training data wherein the constraint is imposed on at least part of a computational load, parameters, a latency, an accuracy, and flops, (ii) generate a state vector corresponding to the training data wherein the state vector includes information on at least one of a degree of complexity of the training data and a degree of sharpness of the training data, and (iii) generate architecture information on a specific sub-kernel having a minimal kernel size and a minimal number of channels suitable for performing the targeted task on the training data having the state vector under the constraint, wherein the specific sub-kernel is a subset of a super kernel corresponding to the maximal capacity of the Big Neural Network Model and is comprised of a kernel size equal to or less than that of the super kernel and the number of the channels in the kernel equal to or less than that in the super kernel, (II) (i) a process of optimizing the Big Neural Network Model by referring to the architecture information on the specific sub-kernel, to thereby generate a specific Small Neural Network Model (S-NN Model) having the architecture information on the specific sub-kernel, from the Big Neural Network Model and (ii) a process of allowing the specific Small Neural Network Model to generate a second inference result on the training data, and (III) a process of calculating one or more first losses by referring to the first inference result and the second inference result and a process of training the Sub-kernel Searching Module by using the first losses.

As one example, at the process of (I), the processor performs or supports another device to perform a process of allowing the Sub-kernel Searching Module to (i) generate scene features corresponding to the training data and then generate the state vector corresponding to the scene features, through a Scene Overviewing Module (SOM) and (ii) generate the architecture information on the specific sub-kernel having the minimal kernel size and the minimal number of the channels suitable for performing the targeted task on the training data having the state vector under the constraint, through a Sub-kernel Network Generator (SNG).

As another example, the processor performs or supports another device to perform (i) a process of training the Scene Overviewing Module and the Sub-kernel Network Generator under the constraint through back-propagation by using the first losses such that the first losses are minimized and (ii) a process of calculating one or more second losses by referring to the state vector and its corresponding ground truth and a process of training the Scene Overviewing Module by using the second losses such that the second losses are minimized.

As another example, the Scene Overviewing Module is comprised of a CNN (Convolutional Neural Network) and wherein the Sub-kernel Network Generator is comprised of an RNN (Recurrent Neural Network), and the processor performs or supports another device to perform a process of training the Scene Overviewing Module and the Sub-kernel Network Generator separately or simultaneously.

As another example, the processor performs or supports another device to perform a process of allowing the CNN in the Scene Overviewing Module to apply at least one convolution operation, at least one pooling operation, and at least one fully-connected operation to the training data, and thus to generate the scene features corresponding to the training data.

As another example, at the process of (II), the processor performs or supports another device to perform a process of optimizing the Big Neural Network Model by adjusting at least one of a kernel height, a kernel width, and the number of channels of the super kernel of the Big Neural Network Model in accordance with the architecture information on the specific sub-kernel, to thereby generate the specific Small Neural Network Model having the architecture information on the specific sub-kernel.

As another example, if a difference between the first inference result and the second inference result is determined as higher than a predetermined threshold, the processor performs or supports another device to perform a process of transmitting the training data and the architecture information on the specific Small Neural Network Model to the server, to thereby allow the server to set the training data as a hard sample to be used for the specific Small Neural Network Model and to add the hard sample to a training database.

In accordance with still yet another aspect of the present disclosure, there is provided an optimizing device for optimizing an on-device neural network model by using a Sub-kernel Searching Module (SSM), including: at least one memory that stores instructions; and at least one processor configured to execute the instructions to perform or support another device to perform: (I) on condition that (i) a Big Neural Network Model (B-NN Model), having a maximal capacity capable of performing a targeted task by using a maximal computing power allowed by an edge device on which a neural network model is to be mounted, has been trained to generate a first inference result on an input data fed thereinto and then a learning device has performed a process of inputting a training data into a Sub-kernel Searching Module (SSM), to thereby allow the Sub-kernel Searching Module to (i-1) identify at least one constraint for training corresponding to the training data wherein the constraint for training is imposed on at least part of a computational load, parameters, a latency, an accuracy, and flops, (i-2) generate a state vector for training corresponding to the training data wherein the state vector for training includes information on at least one of a degree of complexity of the training data and a degree of sharpness of the training data, and (i-3) generate architecture information for training on a specific sub-kernel for training having a minimal kernel size and a minimal number of channels suitable for performing the targeted task on the training data having the state vector for training under the constraint, wherein the specific sub-kernel for training is a subset of a super kernel corresponding to the maximal capacity of the Big Neural Network Model and is comprised of a kernel size equal to or less than that of the super kernel and the number of the channels in the kernel equal to or less than that in the super kernel, (ii) (ii-1) optimizing the Big Neural Network Model by referring to the architecture information for training on the specific sub-kernel for training, to thereby generate a specific Small Neural Network Model (S-NN Model) for training having the architecture information for training on the specific sub-kernel for training, from the Big Neural Network Model and (ii-2) allowing the specific Small Neural Network Model for training to generate a second inference result on the training data, and (iii) calculating one or more first losses by referring to the first inference result and the second inference result and training the Sub-kernel Searching Module by using the first losses, if a test data is acquired, a process of inputting the test data into the Sub-kernel Searching Module (SSM), to thereby allow the Sub-kernel Searching Module to (i) identify at least one constraint for testing corresponding to the test data wherein the constraint for testing is imposed on at least part of a computational load, parameters, a latency, an accuracy, and flops, (ii) generate a state vector for testing corresponding to the test data wherein the state vector for testing includes information on at least one of a degree of complexity of the test data and a degree of sharpness of the test data, and (iii) generate architecture information for testing on a specific sub-kernel for testing having a minimal kernel size and a minimal number of channels suitable for performing the targeted task on the test data having the state vector for testing under the constraint for testing, wherein the specific sub-kernel for testing is a subset of the super kernel corresponding to the maximal capacity of the Big Neural Network Model and is comprised of a kernel size equal to or less than that of the super kernel and the number of the channels in the kernel equal to or less than that in the super kernel, and (II) a process of (i) optimizing the Big Neural Network Model by referring to the architecture information for testing on the specific sub-kernel for testing, to thereby generate a specific Small Neural Network Model (S-NN Model) for testing having the architecture information for testing on the specific sub-kernel for testing, from the Big Neural Network Model and (ii) allowing the specific Small Neural Network Model for testing to generate a third inference result on the test data.

As one example, at the process of (I), the processor performs or supports another device to perform a process of allowing the Sub-kernel Searching Module to (i) generate scene features for testing corresponding to the test data and then generate the state vector for testing corresponding to the scene features for testing, through the Scene Overviewing Module (SOM) and (ii) generate the architecture information for testing on the specific sub-kernel for testing having the minimal kernel size and the minimal number of the channels suitable for performing the targeted task on the test data having the state vector for testing under the constraint for testing, through the Sub-kernel Network Generator (SNG).

As another example, the Scene Overviewing Module is comprised of a CNN (Convolutional Neural Network) and wherein the Sub-kernel Network Generator is comprised of an RNN (Recurrent Neural Network).

As another example, the processor performs or supports another device to perform a process of allowing the CNN in the Scene Overviewing Module to apply at least one convolution operation, at least one pooling operation, and at least one fully-connected operation to the test data, and thus to generate the scene features for testing corresponding to the test data.

As another example, at the process of (II), the processor performs or supports another device to perform a process of optimizing the Big Neural Network Model by adjusting at least one of a kernel height, a kernel width, and the number of channels of the super kernel of the Big Neural Network Model in accordance with the architecture information for testing on the specific sub-kernel for testing, to thereby generate the specific Small Neural Network Model for testing having the architecture information for testing on the specific sub-kernel for testing.

In addition, recordable media that are readable by a computer for storing a computer program to execute the method of the present disclosure is further provided.

BRIEF DESCRIPTION ON THE DRAWINGS

The above and other objects and features of the present disclosure will become apparent from the following description of preferred embodiments given in conjunction with the accompanying drawings. The accompanying drawings used to explain example embodiments of the present disclosure are only part of example embodiments of the present disclosure and other drawings can be obtained based on the drawings by those skilled in the art of the present disclosure without inventive work.

FIG. 8 is a drawing schematically illustrating a method for optimizing the on-device neural network model by using the Sub-kernel Searching Module, with examples of inputs and outputs, in accordance with one example embodiment of the present disclosure.

DETAILED DESCRIPTION OF THE PREFERRED EMBODIMENTS

Figure 1:
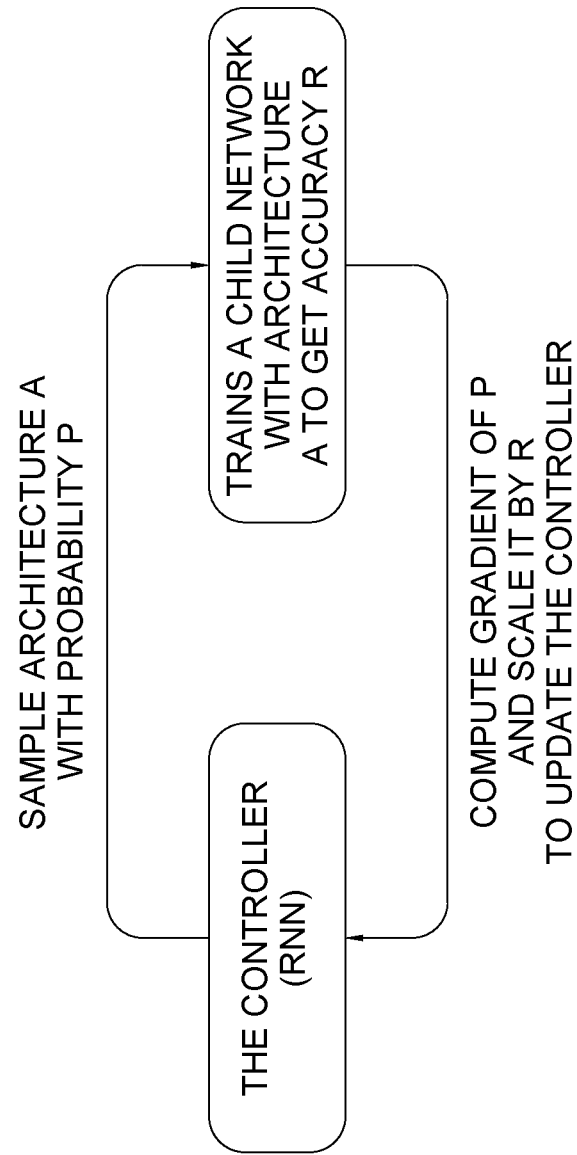
FIGS. 1 and 2 are drawings schematically illustrating conventional neural network optimization systems.
Figure 2:
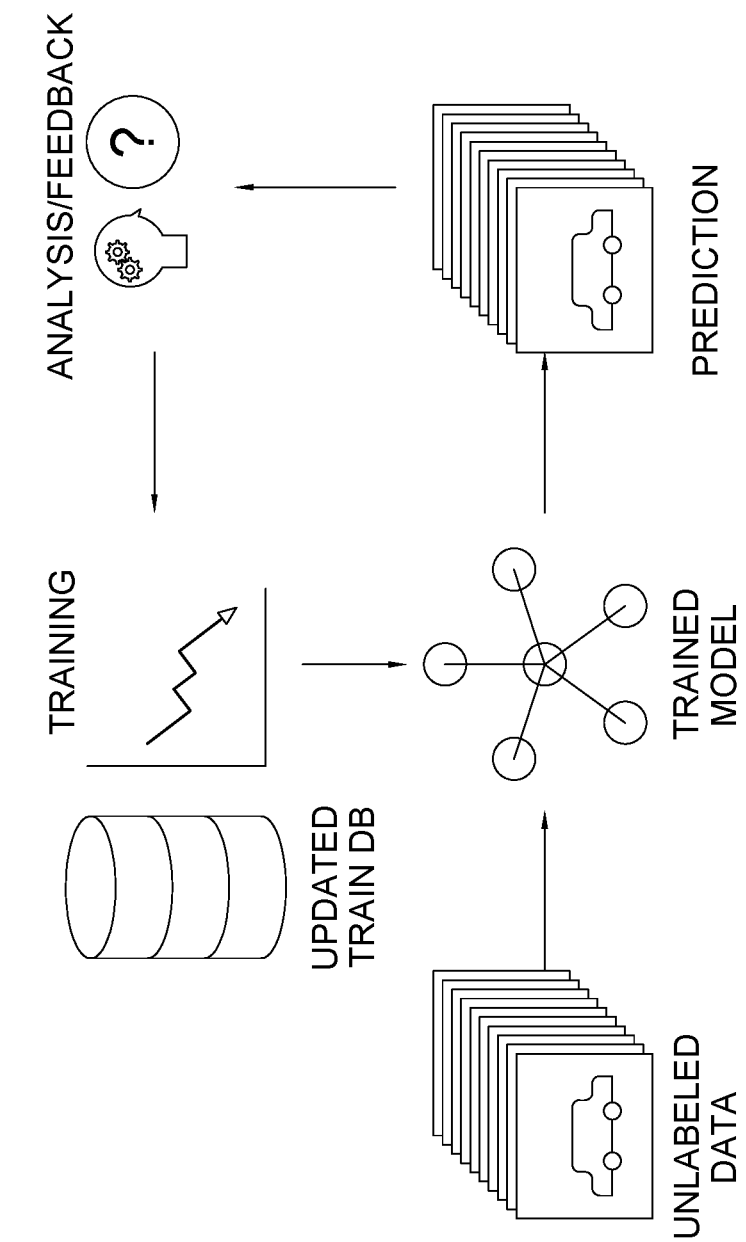

In the following detailed description, reference is made to the accompanying drawings that show, by way of illustration, specific embodiments in which the disclosure may be practiced. These embodiments are described in sufficient detail to enable those skilled in the art to practice the disclosure. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout several aspects.

Any images referred to in the present disclosure may include images related to any roads paved or unpaved, in which case the objects on the roads or near the roads may include vehicles, persons, animals, plants, buildings, flying objects like planes or drones, or any other obstacles which may appear in a road-related scene, but the scope of the present disclosure is not limited thereto. As another example, said any images referred to in the present disclosure may include images not related to any roads, such as images related to alleyway, land lots, sea, lakes, rivers, mountains, forests, deserts, sky, or any indoor space, in which case the objects in said any images may include vehicles, persons, animals, plants, buildings, flying objects like planes or drones, ships, amphibious planes or ships, or any other obstacles which may appear in a scene related to alleyway, land lots, sea, lakes, rivers, mountains, forests, deserts, sky, or any indoor space, but the scope of the present disclosure is not limited thereto.

For reference, throughout the present disclosure, the phrase "for training" or "training" is added for terms related to the learning process, and the phrase "for testing" or "testing" is added for terms related to the testing process, to avoid possible confusion.

Besides, in the detailed description and claims of the present disclosure, a term "include" and its variations are not intended to exclude other technical features, additions, components or steps. Other objects, benefits and features of the present disclosure will be revealed to one skilled in the art, partially from the specification and partially from the implementation of the present disclosure. The following examples and drawings will be provided as examples but they are not intended to limit the present disclosure.

The headings and abstract of the present disclosure provided herein are for convenience only and do not limit or interpret the scope or meaning of the embodiments.

As used in this specification and the appended claims, the singular forms "a," "an," and "the" may include plural referents unless the content and context clearly dictates otherwise.

To allow those skilled in the art to carry out the present disclosure easily, the example embodiments of the present disclosure will be explained by referring to attached diagrams in detail as shown below.

Figure 3:
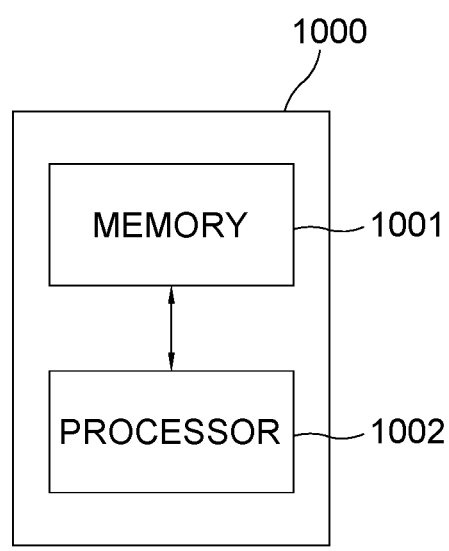
FIG. 3 is a drawing schematically illustrating a learning device capable of training a Sub-kernel Searching Module (SSM) in a method for optimizing an on-device neural network model by using the Sub-kernel Searching Module in accordance with one example embodiment of the present disclosure.

FIG. 3 is a drawing schematically illustrating a learning device 1000 capable of training a Sub-kernel Searching Module (SSM) in a method for optimizing an on-device neural network model by using the Sub-kernel Searching Module in accordance with one example embodiment of the present disclosure.

By referring to FIG. 3, the learning device 1000 may include a memory 1001 for storing instructions to train the Sub-kernel Searching Module, and a processor 1002 for training the Sub-kernel Searching Module according to the instructions in the memory 1001, wherein the Sub-kernel Searching Module is used in the method for optimizing the on-device neural network model.

Specifically, the learning device 1000 may achieve a desired system performance by using combinations of at least one computing device and at least one computer software, e.g., a computer processor, a memory, a storage, an input device, an output device, or any other conventional computing components, an electronic communication device such as a router or a switch, an electronic information storage system such as a network-attached storage (NAS) device and a storage area network (SAN) as the computing device and any instructions that allow the computing device to function in a specific way as the computer software.

The processor of the computing device may include hardware configuration of MPU (Micro Processing Unit) or CPU (Central Processing Unit), cache memory, data bus, etc. Additionally, the computing device may further include OS and software configuration of applications that achieve specific purposes.

However, the case in which the computing device includes an integrated processor, integrating a medium, a processor and a memory, for implementing the present disclosure is not excluded.

A process of training the Sub-kernel Searching Module 100 by using the learning device 1000 configured as explained above is described by referring to FIGS. 4 to 6.

Figure 4:
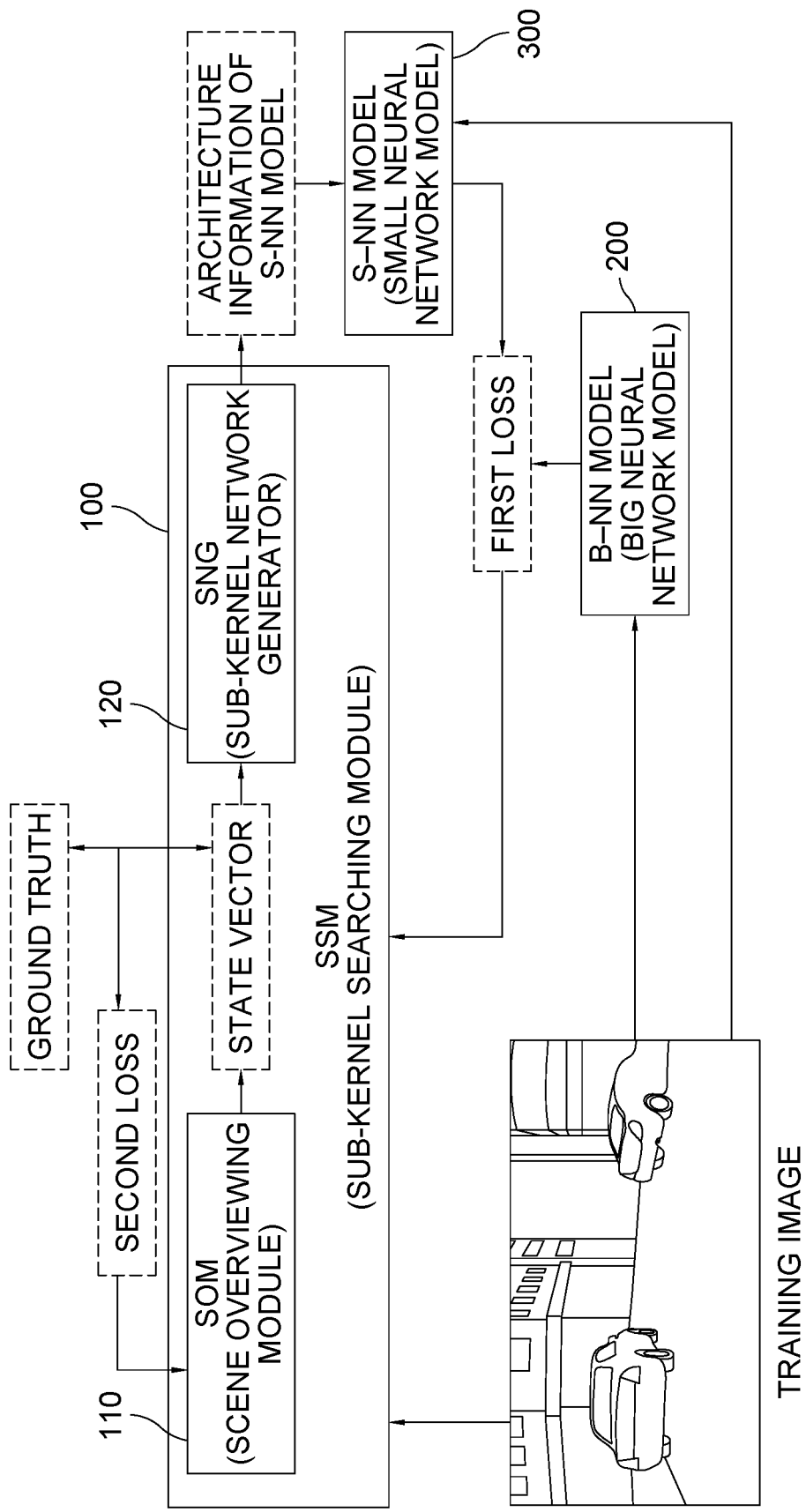
FIG. 4 is a drawing schematically illustrating a process of training the Sub-kernel Searching Module in the method for optimizing an on-device neural network model by using the Sub-kernel Searching Module in accordance with one example embodiment of the present disclosure.

First, by referring to FIG. 4, on condition that a Big Neural Network Model (B-NN Model) 200 having a maximal capacity capable of performing a targeted task by using a maximal computing power allowed by an edge device on which a neural network model is to be mounted has been trained to generate a first inference result on an input data fed thereinto, if a training data is acquired, the learning device 1000 may perform or support another device to perform a process of inputting the training data into the Sub-kernel Searching Module 100, to thereby allow the Sub-kernel Searching Module 100 to (i) identify at least one constraint corresponding to the training data, (ii) generate a state vector corresponding to the training data, and (iii) generate architecture information on a specific sub-kernel having a minimal kernel size and a minimal number of channels suitable for performing the targeted task on the training data having the state vector under the constraint. Herein, the edge device on which the neural network model is to be mounted may be a device capable of performing edge-computing and providing support for real-time applications such as data processing and analyzing data related to autonomous vehicles, unmanned airplanes, robots and AI (artificial intelligence). Also, in the present disclosure, said neural network model to be mounted on the edge device herein may be the Big Neural Network Model 300, and said Big Neural Network Model 300 may be constantly optimized by the Sub-kernel Searching Module to generate sub-architectures of the Big Neural Network Model 300 according to the input data. Herein, said constraint may be imposed on at least part of a computational load, parameters, a latency, an accuracy, and flops, and the constraint may be affected by a device state of the edge device and surrounding environment at the time the training data is inputted. Also, the constraint may be predetermined by the edge device or adjusted by additional input regarding the conditions. In addition, said targeted task herein may serve purposes such as data analysis, data classification, detection of information, etc., and accordingly, types of data used, such as texts, images, images containing texts, etc., by the targeted task may also vary depending on the purposes, but the present disclosure is not limited thereto.

Further, said state vector herein may be a 1-dimensional vector including information on at least one of a degree of complexity of the training data and a degree of sharpness of the training data, and accordingly, the state vector may serve as a criterion for determining a difficulty level of the training data. Also, said specific sub-kernel herein may be a subset of a super kernel corresponding to the maximal capacity of the Big Neural Network Model and may be comprised of a kernel size equal to or less than that of the super kernel and the number of the channels in the kernel equal to or less than that in the super kernel.

Meanwhile, the Sub-kernel Searching Module 100 may be comprised of a Scene Overviewing Module (SOM) 110 and a Sub-Kernel Network Generator (SNG) 120.

In detail, the learning device 1000 may perform or support another device to perform a process of allowing the Sub-kernel Searching Module 100 to (i) generate scene features corresponding to the training data and then generate the state vector corresponding to the scene features, through the Scene Overviewing Module (SOM) 110 and (ii) generate the architecture information on the specific sub-kernel having the minimal kernel size and the minimal number of the channels suitable for performing the targeted task on the training data having the state vector under the constraint, through the Sub-kernel Network Generator (SNG) 120.

Herein, said computational load, said parameters, said latency, said accuracy, and said flops may be correlated with each other by the constraint. For example, while an increased requirement for the accuracy may require an increase in the minimum number of the parameters used, a decrease in the computation load resulting from a drop in the flops or a rise in the latency may restrict the number of the parameters allowed for use. Therefore, the architecture information of the specific sub-kernel may include information on the minimal kernel size and the minimal number of channels corresponding to a minimal capacity capable of performing the targeted task on the training data having the state vector under the constraint.

Herein, the Scene Overviewing Module 110 may be configured as a small Convolutional Neural Network (CNN) that does not significantly affect an overall performance of the edge device, and the Sub-kernel Network Generator 120 may be configured as a small Recurrent Neural Network (RNN) that does not significantly affect the overall performance of the edge device.

Figure 5:
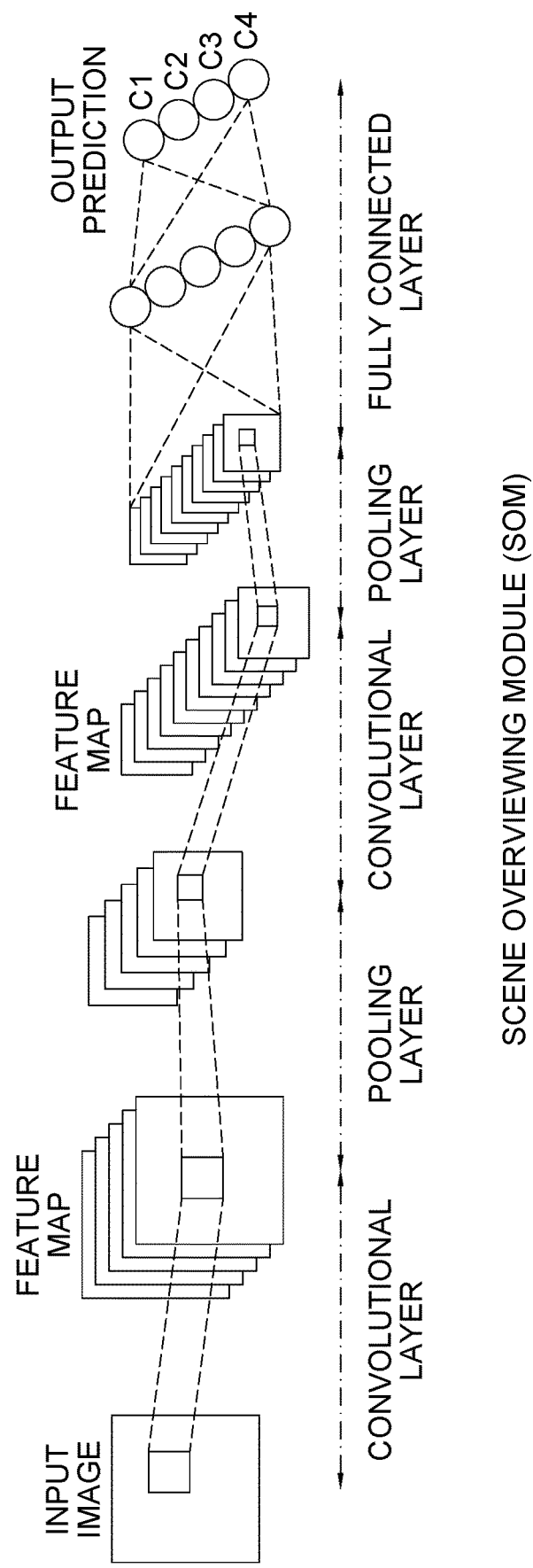
FIG. 5 is a drawing schematically illustrating a structure of a Scene Overviewing Module (SOM) included in the Sub-kernel Searching Module in accordance with one example embodiment of the present disclosure.

By referring to FIG. 5, as one example, the Scene Overviewing Module 110 may be configured to include convolutional layers, pooling layers and a fully connected layer. When the training data is inputted into the Scene Overviewing Module 110, feature maps generated through a plurality of convolutional layers and pooling layers may be inputted into the fully connected layer to generate output predictions. Herein, the convolutional layers and the pooling layers may be alternatively arranged. Also, the output predictions may be the state vector in the form of the 1-dimensional vector, e.g., the output of the Scene Overviewing Module 110 per se. As another example, the state vector may be acquired by converting the output of the fully connected layer through a series of some processes.

Also, data type of the architecture information on the specific sub-kernel outputted from the Sub-kernel Network Generator 120 may be a string or a dictionary, and for example, the architecture information may be outputted in a form of {{conv1: {k=3, c=26}}, {conv2: {k=7, c=35}}, . . . , {ssd_layer: {k=1, c=121}}}. Therefore, the Sub-kernel Network Generator 120 may generate information on parameters of an architecture of the sub-kernel which corresponds to the state vector reflecting information on the scene features generated under the constraint.

Next, by referring to FIG. 4 again, the learning device 1000 may perform or support another device to perform (i) a process of optimizing the Big Neural Network Model 200 by referring to the architecture information on the specific sub-kernel, to thereby generate a specific Small Neural Network Model (S-NN Model) 300 having the architecture information on the specific sub-kernel, from the Big Neural Network Model 200 and (ii) a process of allowing the specific Small Neural Network Model 300 to generate a second inference result on the training data. Hereafter, a Small Neural Network Model (S-NN Model) 300 for training may be referred to as the Small Neural Network Model (S-NN Model) 300 for convenience of explanation, and vice versa, as the case may be.

Herein, the learning device 1000 may perform or support another device to perform a process of optimizing the Big Neural Network Model 200 by adjusting at least one of a kernel height, a kernel width, and the number of channels of the super kernel of the Big Neural Network Model 200 in accordance with the architecture information on the specific sub-kernel, to thereby generate the specific Small Neural Network Model 300 having the architecture information on the specific sub-kernel. That is, at least one of the kernel size and a channel size of the super kernel may be adjusted by adjusting at least one of the kernel height, the kernel width, and the number of channels of the super kernel, and this may result in changes of size or volume of the super kernel of the Big Neural Network Model 200.

Figure 6:
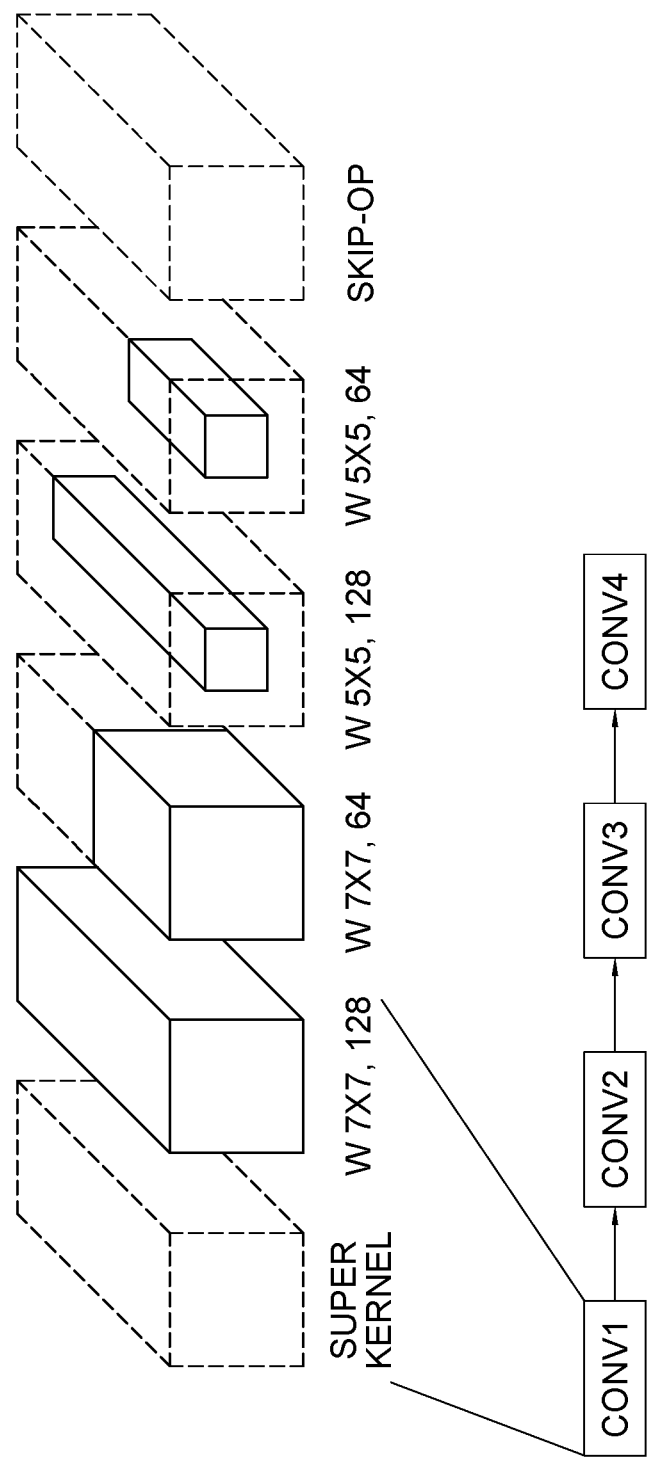
FIG. 6 is a drawing schematically illustrating a method of generating and training a Big Neural Network Model (B-NN Model) and a Small Neural Network Model (S-NN Model) by using a concept of a super kernel and a sub-kernel in accordance with one example embodiment of the present disclosure.

To explain further, FIG. 6 is a drawing schematically illustrating a method of generating and training the Big Neural Network Model 200 and the Small Neural Network Model 300 by using the concept of the super kernel and the sub-kernel in accordance with one example embodiment of the present disclosure. Herein, the Big Neural Network Model 200 may be a neural network model having a maximum capacity, i.e. a maximum amount of computational load and a maximum number of parameters, allowable by a computing power of the edge device, such as an autonomous vehicle, an autonomous plane, a robot, etc., in which the neural network model is embedded. Also, the Big Neural Network Model (B-NN Model) may be designed by human experts.

Herein, the super kernel may represent a kernel in the neural network model comprised of a maximum kernel height, a maximum kernel width and a maximum number of channels, that is, (max_kernel_w*max_kernel_h*max_ch). In other words, the super kernel may represent a 3-dimensional structure comprised of a 2-dimensional kernel on, e.g., X-Y plane, and a 1-dimensional channel arranged along, e.g., Z-axis perpendicular to the X-Y plane. Therefore, the super kernel hereafter may be described to have a maximum size of the kernel and a maximum number of the channels, in short, for convenience of explanation.

As an example, a conventional method such as one-shot neural architecture search may be used for generating and training the Big Neural Network Model 200 and the Small Neural Network Model 300.

Herein, if the size of the kernel and the number of the channels are adjusted every step by using a method of training some parts of the parameters belonging to a subset of the super kernel of the Big Neural Network Model 200, the problem of a drastic drop in performance upon a slight change of the size of the kernel and the number of the channels during inference may be prevented and the performance may be adjusted in proportion to a decrease in an amount of the computational load and a decrease in the number of the parameters.

Giving one example of training the Big Neural Network Model (B-NN Model) by referring to FIG. 6, in the first convolutional layer, i.e. conv1, comprised of a dimension of the super kernel, e.g. (7*7) kernel size and 128 channels, the center of the super kernel having a dimension of (3*3*64) may be used for inference and trained during a 1-st step, and a part of the super kernel having a dimension of (5*5*64) may be used for inference and trained during a 2-nd step, and so on. Through this training method, some parts of the parameters belonging to the subset of the super kernel may be trained at each step.

Meanwhile, detailed methods of training the neural network model while adjusting the size of the kernel and the number of channels of the super kernel may be further found in the following papers: "Single-Path NAS: Designing Hardware-Efficient ConvNets in less than 4 Hours" (Dimitrios Stamoulis, 2019), "Universally Slimmable Networks and Improved Training Techniques" (Jiahui Yu, 2019). As one example, temporarily zeroing out a region lying outside the kernel being used during inference and training may allow the performance to be maintained irrespective of the size of the kernel. Also, if batch statistics are obtained again using a large amount of data after training, a drastic performance drop resulting from a change in the number of channels may be prevented.

Therefore, the present disclosure may generate and train the Big Neural Network Model 200 having the super kernel, to thereby optimize the Big Neural Network Model 200 and thus generate a Small Neural Network Model 300. Herein, the Small Neural Network Model 300 may be a neural network model having the minimal kernel size and the minimal number of the channels suitable for performing the targeted task on the training data having a specific difficulty level under the constraint imposed on at least part of the computational load, the parameters, the latency, the accuracy, the flops, etc.

Next, by referring to FIG. 4 again, the learning device 1000 may perform or support another device to perform a process of calculating one or more first losses by referring to the first inference result and the second inference result and a process of training the Scene Overviewing Module 110 and the Sub-kernel Network Generator 120 under the constraint through back-propagation by using the first losses such that the first losses are minimized.

Additionally, the learning device 1000 may perform a process of calculating one or more second losses by referring to the state vector and its corresponding ground truth and a process of training the Scene Overviewing Module 110 by using the second losses such that the second losses are minimized. As a result, the Scene Overviewing Module 110 may be trained such that more accurate information on the training data is provided to the Sub-Kernel Network Generator 120. Herein, the Scene Overviewing Module 110 may be trained by using the state vector and its corresponding ground truth generated manually or generated by highly trained neural networks, but the Scene Overviewing Module 110 may also instead be trained by unsupervised learning with the help of, e.g., Generative Adversarial Network (GAN).

Herein, as described above, the Scene Overviewing Module 110 and the Sub-Kernel Network Generator 120 in the Sub-kernel Searching Module 100 may be configured as the Convolutional Neural Network (CNN) and the Recurrent Neural Network (RNN) respectively. As such, the Scene Overviewing Module 110 and the Sub-Kernel Network Generator 120 may be trained individually, or trained together through a combined training method. The combined training method may utilize techniques such as the one described in the paper, "Show and Tell: A Neural Image Caption Generator" (Oriol Vinyals, 2015).

Additionally, the learning device 1000 may train the Scene Overviewing Module 110 through the back-propagation using the first losses such that the first losses between the Big Neural Network Model 200 and the Small Neural Network Model 300 are minimized under the condition in which the constraints related to at least part of the computational load, the parameters, the latency, the accuracy, the flops, etc. are imposed and such that the Scene Overviewing Module 110 transmits more accurate information on the training data to the Sub-Kernel Network Generator 120. Herein, if the first losses are determined as higher than a preset threshold, the Big Neural Network Model 200 may have a sufficient capacity to process the training data while the Small Neural Network Model 300 may not have a sufficient capacity to process the training data.

As one example, the state vector outputted from the Scene Overviewing Module (SOM) 110 may reflect scene information corresponding to the scene features. Herein, the scene information may include at least one of a degree of complexity of the training data and a degree of sharpness of the training data, but the present disclosure is not limited thereto. The more complex and the less clear the training data is, the higher a possibility of the training data being determined as a hard sample, and in such cases, the training of the Scene Overviewing Module 110 may be performed to require more computational load and more parameters for the Small Neural Network Model 300. Also, a performance of the Scene Overviewing Module 110 may be adjusted according to given conditions such as a performance of the edge device, size of an original network or aimed performances in speed and accuracy, etc.

Further on, the learning device 1000 may train the Sub-Kernel Network Generator 120 through the back-propagation using the first losses such that the first losses between the Big Neural Network Model 200 and the Small Neural Network Model 300 are minimized under the condition in which the constraints related to at least part of the computational load, the parameters, the latency, the accuracy, the flops, etc. are imposed. Herein, according to differentiability of the constraints, the Sub-Kernel Network Generator 120 may be trained by using methods such as optimization using reinforcement learning or gradient descent optimization, etc.

Meanwhile, during the training processes of the Sub-kernel Searching Module 100 as explained above, if the first losses are determined as higher than the preset threshold, i.e., if a difference between the first inference result and the second inference result is determined as higher than a predetermined threshold, the training data may be determined as the hard sample for the specific Small Neural Network Model 300 while the same training data may be determined as not the hard sample for the Big Neural Network Model 200. Therefore, in such case, the learning device 1000 may perform or support another device to perform a process of transmitting the training data and the architecture information on the specific Small Neural Network Model 300 to a server (not shown), to thereby allow the server to set the training data as the hard sample to be used for the specific Small Neural Network Model 300 and to add the training data to a training database as the hard sample. Herein, said preset threshold and said predetermined threshold may be the same as or different from each other.

However, unlike this, when a hard sample search suitable for a model size using a separate computing device is required, the Sub-kernel Searching Module 100 may function as a hard sample searcher. Specifically, since the first losses determined as higher than the preset threshold imply that problems solvable with the capacity of the Big Neural Network Model 200 may not be solvable with the capacity of the Small Neural Network Model 300, in such case, the training data and its corresponding architecture information on the specific Small Neural Network Model 300 generated by the Sub-kernel Searching Module 100 may be transmitted to the server so that the training data may be tagged as the hard sample for the specific Small Neural Network Model 300 with a specific structure, a specific computational load, a specific number of parameters, etc., and the hard sample may be added to the training database. Therefore, the hard samples stored in the training database may be used in training the neural network model having a similar amount of computational load and a similar number of parameters to the specific Small Neural Network Model 300. Herein, the specific Small Neural Network Model 300 in the present disclosure may refer to any subset of all possible structures of the Small Neural Network Model 300, and therefore said specific Small Neural Network Model 300 may not be the same as each other.

Figure 7:
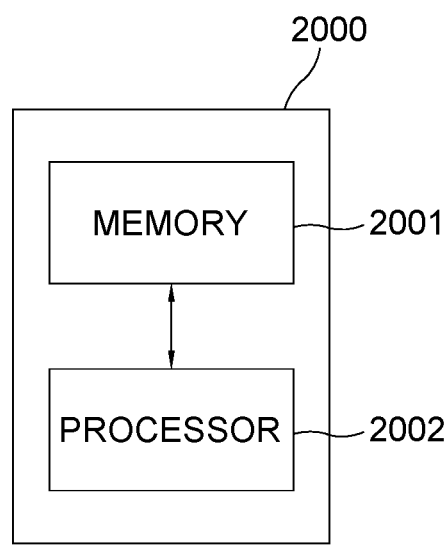
FIG. 7 is a drawing schematically illustrating an optimizing device capable of optimizing the on-device neural network model by using the Sub-kernel Searching Module in accordance with one example embodiment of the present disclosure.

Meanwhile, on condition that the Sub-kernel Searching Module 100 has been trained as described above, an optimizing device may use the Sub-kernel Searching Module 100 trained as above to optimize the on-device neural network model as shown in FIGS. 7 and 8.

First, FIG. 7 is a drawing schematically illustrating the optimizing device 2000 capable of optimizing the on-device neural network model by using the Sub-kernel Searching Module 100 in accordance with one example embodiment of the present disclosure.

By referring to FIG. 7, the optimizing device 2000 may include a memory 2001 for storing instructions to optimize the Big Neural Network Model, i.e. to optimize the on-device neural network model, by using the Sub-kernel Searching Module 100 and a processor 2002 for optimizing the Big Neural Network Model by using the Sub-kernel Searching Module 100 according to the instructions in the memory 2001. Herein, the Big Neural Network Model which serves to be a reference value for generating and testing a specific Small Neural Network Model 300 for testing is not indicated in FIGS. 7 and 8. However, the explanation regarding the Big Neural Network Model given in the process of training the Sub-kernel Searching Module 100 may still apply mutatis mutandis.

Specifically, the optimizing device 2000 may achieve a desired system performance by using combinations of at least one computing device and at least one computer software, e.g., a computer processor, a memory, a storage, an input device, an output device, or any other conventional computing components, an electronic communication device such as a router or a switch, an electronic information storage system such as a network-attached storage (NAS) device and a storage area network (SAN) as the computing device and any instructions that allow the computing device to function in a specific way as the computer software.

The processor of the computing device may include hardware configuration of MPU (Micro Processing Unit) or CPU (Central Processing Unit), cache memory, data bus, etc. Additionally, the computing device may further include OS and software configuration of applications that achieve specific purposes.

However, the case in which the computing device includes an integrated processor, integrating a medium, a processor and a memory, for implementing the present disclosure is not excluded.

Meanwhile, the optimizing device 2000 may perform or support the process of optimizing the Big Neural Network Model by using the Sub-Kernel Searching Module 100, corresponding to the edge device, according to data inputted into the edge device, and may be mounted on the edge device on which the neural network model is applied.

A method for optimizing the neural network model by using the Sub-Kernel Searching Module 100 at the optimizing device 2000 is as follows. In the following description, detailed explanation of parts that can be easily understood from the description provided by referring to FIGS. 4 to 6 are omitted.

First, if a test data is acquired, the optimizing device 2000 may perform or support another device to perform a process of inputting the test data into the Sub-kernel Searching Module (SSM) 100, to thereby allow the Sub-kernel Searching Module 100 to (i) identify at least one constraint for testing corresponding to the test data wherein the constraint for testing is imposed on at least part of a computational load, parameters, a latency, an accuracy, and flops, (ii) generate a state vector for testing corresponding to the test data wherein the state vector for testing includes information on at least one of a degree of complexity of the test data and a degree of sharpness of the test data, and (iii) generate architecture information for testing on a specific sub-kernel for testing having a minimal kernel size and a minimal number of channels suitable for performing the targeted task on the test data having the state vector for testing under the constraint for testing, wherein the specific sub-kernel for testing is a subset of the super kernel corresponding to the maximal capacity of the Big Neural Network Model and is comprised of a kernel size equal to or less than that of the super kernel and the number of the channels in the kernel equal to or less than that in the super kernel.

Next, the optimizing device 2000 may perform or support another device to perform a process of (i) optimizing the Big Neural Network Model by referring to the architecture information for testing on the specific sub-kernel for testing, to thereby generate the specific Small Neural Network Model (S-NN Model) 300 for testing having the architecture information for testing on the specific sub-kernel for testing, from the Big Neural Network Model and (ii) allowing the specific Small Neural Network Model 300 for testing to generate a third inference result on the test data. Herein, the architecture information for training on the specific sub-kernel for training obtained during the process of training the Sub-kernel Searching Module 100 and the architecture information for testing on the specific sub-kernel for testing obtained during the process of testing the Sub-kernel Searching Module 100 may not be the same as each other due to difference in difficulty levels of the training data and the test data. Resultantly, whereas the capacity of the Big Neural Network Model may stay unchanged during the processes of training and testing the Sub-kernel Searching Module 100 due to a fixed capacity of the edge device, the capacities of the Small Neural Network Model 300 for training and the Small Neural Network Model 300 for testing may not be the same as each other.

Herein, the optimizing device 2000 may perform or support another device to perform a process of allowing the Sub-kernel Searching Module 100 to (i) generate scene features for testing corresponding to the test data and then generate the state vector for testing corresponding to the scene features for testing, through the Scene Overviewing Module (SOM) 110 and (ii) generate the architecture information for testing on the specific sub-kernel for testing having the minimal kernel size and the minimal number of the channels suitable for performing the targeted task on the test data having the state vector for testing under the constraint for testing, through the Sub-kernel Network Generator (SNG) 120.

Following, the optimizing device 2000 may perform or support another device to perform a process of optimizing the Big Neural Network Model by adjusting at least one of the kernel height, the kernel width, and the number of channels of the super kernel of the Big Neural Network Model in accordance with the architecture information for testing on the specific sub-kernel for testing, to thereby generate the specific Small Neural Network Model 300 for testing having the architecture information for testing on the specific sub-kernel for testing.

In detail, FIG. 8 is a drawing schematically illustrating a method for optimizing the on-device neural network model by using the Sub-kernel Searching Module, with examples of inputs and outputs, in accordance with one example embodiment of the present disclosure.

By referring to FIG. 8, the optimizing device 2000 may optimize the Big Neural Network Model by referring to the architecture information for testing on the specific sub-kernel for testing and thus generate a specific Small Neural Network Model for testing, e.g. an S-NN Model 300_1 or an S-NN Model 300_2, having the architecture information for testing on the specific sub-kernel for testing, to there by allow the specific Small Neural Network Model for testing, e.g. the S-NN Model 300_1 or the S-NN Model 300_2, to perform the third inference on the test data.

Herein, since the specific Small Neural Network Model for testing, e.g. the S-NN Model 300_1 or the S-NN Model 300_2, is the subset of the Big Neural Network Model, a performance of the specific Small Neural Network Model for testing is always lower than or equal to a performance of the Big Neural Network Model. Besides, a capacity required for the specific sub-kernel for testing of the specific Small Neural Network Model for testing may increase as a difficulty level of the test data increases.

As one example, if the test data is an easy sample, the Big Neural Network Model may be optimized to generate the specific Small Neural Network Model 300_1 for testing having a relatively small size of weight and a relatively small number of computation, to thereby perform the third inference on the test data with a smaller capacity compared to that of the Big Neural Network Model, e.g. 12% of computational load compared to that of the Big Neural Network Model. In contrast, if the test data is a hard sample, the Big Neural Network Model may be optimized to generate the specific Small Neural Network Model 300_2 for testing having a larger size of weight and a larger number of computation compared to the specific Small Neural Network Model 300_1 for testing but having a smaller size of weight and a smaller number of computation compared to the Big Neural Network Model, to thereby perform the third inference on the test data with the capacity that is larger than that of the specific Small Neural Network Model 300_1 for testing but smaller than that of the Big Neural Network Model, e.g. 88% of computational load compared to that of the Big Neural Network Model.

That is, the specific Small Neural Network Model for testing, e.g. the S-NN Model 300_1 or the S-NN Model 300_2, generated by optimizing the Big Neural Network Model in accordance with the present disclosure may have an optimized capacity that corresponds to a difficulty level of a sample, and the neural network model may be optimized on the edge device without a help from a server.

In addition, a forth inference may be performed by the Big Neural Network Model on the test data and if a difference between results of the third inference result and the forth inference result is determined as higher than a predefined threshold, the optimizing device 2000 may transmit the test data and the architecture information on the specific Small Neural Network Model for testing, e.g. the S-NN Model 300_1 or the S-NN Model 300_2, to the server, to thereby allow the server to tag the test data as the hard sample of the specific Small Neural Network Model for testing, e.g. the S-NN Model 300_1 or the S-NN Model 300_2, and to add the hard sample to the training database.

Herein, the training of the Sub-kernel Searching Module 100 may be continuously performed on the edge device by using the data continuously inputted into the edge device, and inference may be performed using the Small Neural Network Model 300 after the training of the Sub-kernel Searching Module 100 on the edge device is performed for a certain period. Also, according to overhead of the Sub-kernel Searching Module 100, it can be decided whether to operate the Sub-kernel Searching Module 100 every frame to select architecture information on a new Small Neural Network Model 300 outputted every frame or to operate the Sub-kernel Searching Module 100 every certain number of frames to use ultimate architecture information outputted every certain number of the frames.

The present disclosure has an effect of reducing size of weights and the number of computations (mac/flops) read during inference by applying a computational load optimized according to a difficulty level of a sample.

The present disclosure has another effect of performing an optimization of the neural network model mounted on the edge device without using an external server.

The present disclosure has still another effect of optimizing the neural network model mounted on the edge device by generating a sub-architecture of the neural network model according to computing power and surrounding environment of the edge device.

The present disclosure has still yet another effect of reducing sizes of weights and the number of computations (mac/flops) read during inference by applying a computational load optimized according to a difficulty level of an inputted data.

The present disclosure has still yet another effect of improving performance levels of each sub-architecture of the neural network model by continuously collecting hard samples for each level of computational load corresponding to each sub-architecture.

The embodiments of the present disclosure as explained above can be implemented in a form of executable program command through a variety of computer means recordable in computer readable media. The computer readable media may include solely or in combination, program commands, data files, and data structures. The program commands recorded in the media may be components specially designed for the present disclosure or may be usable to those skilled in the art in a field of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a complier but also a high level code that can be used by an interpreter etc., which is executed by a computer. The aforementioned hardware device can work as one or more software modules to perform the action of the present disclosure and vice versa.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims. Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for optimizing an on-device neural network model by using a Sub-kernel Searching Module (SSM), comprising steps of:
   (a) a learning device, on condition that a Big Neural Network Model (B-NN Model) having a maximal capacity capable of performing a targeted task by using a maximal computing power allowed by an edge device on which a neural network model is to be mounted has been trained to generate a first inference result on an input data fed thereinto, if a training data is acquired, performing or supporting another device to perform a process of inputting the training data into a Sub-kernel Searching Module (SSM), to thereby allow the Sub-kernel Searching Module to (i) identify at least one constraint corresponding to the training data wherein the constraint is imposed on at least part of a computational load, parameters, a latency, an accuracy, and flops, (ii) generate a state vector corresponding to the training data wherein the state vector includes information on at least one of a degree of complexity of the training data and a degree of sharpness of the training data, and (iii) generate architecture information on a specific sub-kernel having a minimal kernel size and a minimal number of channels suitable for performing the targeted task on the training data having the state vector under the constraint, wherein the specific sub-kernel is a subset of a super kernel corresponding to the maximal capacity of the Big Neural Network Model and is comprised of a kernel size equal to or less than that of the super kernel and the number of the channels in the kernel equal to or less than that in the super kernel;
   (b) the learning device performing or supporting another device to perform (i) a process of optimizing the Big Neural Network Model by referring to the architecture information on the specific sub-kernel, to thereby generate a specific Small Neural Network Model (S-NN Model) having the architecture information on the specific sub-kernel, from the Big Neural Network Model and (ii) a process of allowing the specific Small Neural Network Model to generate a second inference result on the training data; and
   (c) the learning device performing or supporting another device to perform a process of calculating one or more first losses by referring to the first inference result and the second inference result and a process of training the Sub-kernel Searching Module by using the first losses.

2. The method of claim 1, wherein, at the step of (a), the learning device performs or supports another device to perform a process of allowing the Sub-kernel Searching Module to (i) generate scene features corresponding to the training data and then generate the state vector corresponding to the scene features, through a Scene Overviewing Module (SOM) and (ii) generate the architecture information on the specific sub-kernel having the minimal kernel size and the minimal number of the channels suitable for performing the targeted task on the training data having the state vector under the constraint, through a Sub-kernel Network Generator (SNG).

3. The method of claim 2, wherein the learning device performs or supports another device to perform (i) a process of training the Scene Overviewing Module and the Sub-kernel Network Generator under the constraint through back-propagation by using the first losses such that the first losses are minimized and (ii) a process of calculating one or more second losses by referring to the state vector and its corresponding ground truth and a process of training the Scene Overviewing Module by using the second losses such that the second losses are minimized.

4. The method of claim 2, wherein the Scene Overviewing Module is comprised of a CNN (Convolutional Neural Network) and wherein the Sub-kernel Network Generator is comprised of an RNN (Recurrent Neural Network), and
wherein the learning device performs or supports another device to perform a process of training the Scene Overviewing Module and the Sub-kernel Network Generator separately or simultaneously.

5. The method of claim 4, wherein the learning device performs or supports another device to perform a process of allowing the CNN in the Scene Overviewing Module to apply at least one convolution operation, at least one pooling operation, and at least one fully-connected operation to the training data, and thus to generate the scene features corresponding to the training data.

6. The method of claim 1, wherein, at the step of (b), the learning device performs or supports another device to perform a process of optimizing the Big Neural Network Model by adjusting at least one of a kernel height, a kernel width, and the number of channels of the super kernel of the Big Neural Network Model in accordance with the architecture information on the specific sub-kernel, to thereby generate the specific Small Neural Network Model having the architecture information on the specific sub-kernel.

7. The method of claim 1, wherein, if a difference between the first inference result and the second inference result is determined as higher than a predetermined threshold, the learning device performs or supports another device to perform a process of transmitting the training data and the architecture information on the specific Small Neural Network Model to the server, to thereby allow the server to set the training data as a hard sample to be used for the specific Small Neural Network Model and to add the hard sample to a training database.

8. A method for optimizing an on-device neural network model by using a Sub-kernel Searching Module (SSM), comprising steps of:
(a) on condition that (i) a Big Neural Network Model (B-NN Model), having a maximal capacity capable of performing a targeted task by using a maximal computing power allowed by an edge device on which a neural network model is to be mounted, has been trained to generate a first inference result on an input data fed thereinto and then a learning device has performed a process of inputting a training data into a Sub-kernel Searching Module (SSM), to thereby allow the Sub-kernel Searching Module to (i-1) identify at least one constraint for training corresponding to the training data wherein the constraint for training is imposed on at least part of a computational load, parameters, a latency, an accuracy, and flops, (i-2) generate a state vector for training corresponding to the training data wherein the state vector for training includes information on at least one of a degree of complexity of the training data and a degree of sharpness of the training data, and (i-3) generate architecture information for training on a specific sub-kernel for training having a minimal kernel size and a minimal number of channels suitable for performing the targeted task on the training data having the state vector for training under the constraint, wherein the specific sub-kernel for training is a subset of a super kernel corresponding to the maximal capacity of the Big Neural Network Model and is comprised of a kernel size equal to or less than that of the super kernel and the number of the channels in the kernel equal to or less than that in the super kernel, (ii) (ii-1) optimizing the Big Neural Network Model by referring to the architecture information for training on the specific sub-kernel for training, to thereby generate a specific Small Neural Network Model (S-NN Model) for training having the architecture information for training on the specific sub-kernel for training, from the Big Neural Network Model and (ii-2) allowing the specific Small Neural Network Model for training to generate a second inference result on the training data, and (iii) calculating one or more first losses by referring to the first inference result and the second inference result and training the Sub-kernel Searching Module by using the first losses, an optimizing device, if a test data is acquired, performing or supporting another device to perform a process of inputting the test data into the Sub-kernel Searching Module (SSM), to thereby allow the Sub-kernel Searching Module to (i) identify at least one constraint for testing corresponding to the test data wherein the constraint for testing is imposed on at least part of a computational load, parameters, a latency, an accuracy, and flops, (ii) generate a state vector for testing corresponding to the test data wherein the state vector for testing includes information on at least one of a degree of complexity of the test data and a degree of sharpness of the test data, and (iii) generate architecture information for testing on a specific sub-kernel for testing having a minimal kernel size and a minimal number of channels suitable for performing the targeted task on the test data having the state vector for testing under the constraint for testing, wherein the specific sub-kernel for testing is a subset of the super kernel corresponding to the maximal capacity of the Big Neural Network Model and is comprised of a kernel size equal to or less than that of the super kernel and the number of the channels in the kernel equal to or less than that in the super kernel; and
(b) the optimizing device performing or supporting another device to perform a process of (i) optimizing the Big Neural Network Model by referring to the architecture information for testing on the specific sub-kernel for testing, to thereby generate a specific Small Neural Network Model (S-NN Model) for testing having the architecture information for testing on the specific sub-kernel for testing, from the Big Neural Network Model and (ii) allowing the specific Small Neural Network Model for testing to generate a third inference result on the test data.

9. The method of claim 8, wherein, at the step of (a), the optimizing device performs or supports another device to perform a process of allowing the Sub-kernel Searching Module to (i) generate scene features for testing corresponding to the test data and then generate the state vector for testing corresponding to the scene features for testing, through the Scene Overviewing Module (SOM) and (ii) generate the architecture information for testing on the specific sub-kernel for testing having the minimal kernel size and the minimal number of the channels suitable for performing the targeted task on the test data having the state vector for testing under the constraint for testing, through the Sub-kernel Network Generator (SNG).

10. The method of claim 9, wherein the Scene Overviewing Module is comprised of a CNN (Convolutional Neural Network) and wherein the Sub-kernel Network Generator is comprised of an RNN (Recurrent Neural Network).

11. The method of claim 10, wherein the optimizing device performs or supports another device to perform a process of allowing the CNN in the Scene Overviewing Module to apply at least one convolution operation, at least one pooling operation, and at least one fully-connected operation to the test data, and thus to generate the scene features for testing corresponding to the test data.

12. The method of claim 8, wherein, at the step of (b), the optimizing device performs or supports another device to perform a process of optimizing the Big Neural Network Model by adjusting at least one of a kernel height, a kernel width, and the number of channels of the super kernel of the Big Neural Network Model in accordance with the architecture information for testing on the specific sub-kernel for testing, to thereby generate the specific Small Neural Network Model for testing having the architecture information for testing on the specific sub-kernel for testing.

13. A learning device for optimizing an on-device neural network model by using a Sub-kernel Searching Module (SSM), comprising:
at least one memory that stores instructions; and
at least one processor configured to execute the instructions to perform or support another device to perform: (I) on condition that a Big Neural Network Model (B-NN Model) having a maximal capacity capable of performing a targeted task by using a maximal computing power allowed by an edge device on which a neural network model is to be mounted has been trained to generate a first inference result on an input data fed thereinto, if a training data is acquired, a process of inputting the training data into a Sub-kernel Searching Module (SSM), to thereby allow the Sub-kernel Searching Module to (i) identify at least one constraint corresponding to the training data wherein the constraint is imposed on at least part of a computational load, parameters, a latency, an accuracy, and flops, (ii) generate a state vector corresponding to the training data wherein the state vector includes information on at least one of a degree of complexity of the training data and a degree of sharpness of the training data, and (iii) generate architecture information on a specific sub-kernel having a minimal kernel size and a minimal number of channels suitable for performing the targeted task on the training data having the state vector under the constraint, wherein the specific sub-kernel is a subset of a super kernel corresponding to the maximal capacity of the Big Neural Network Model and is comprised of a kernel size equal to or less than that of the super kernel and the number of the channels in the kernel equal to or less than that in the super kernel, (II) (i) a process of optimizing the Big Neural Network Model by referring to the architecture information on the specific sub-kernel, to thereby generate a specific Small Neural Network Model (S-NN Model) having the architecture information on the specific sub-kernel, from the Big Neural Network Model and (ii) a process of allowing the specific Small Neural Network Model to generate a second inference result on the training data, and (III) a process of calculating one or more first losses by referring to the first inference result and the second inference result and a process of training the Sub-kernel Searching Module by using the first losses.

14. The learning device of claim 13, wherein, at the process of (I), the processor performs or supports another device to perform a process of allowing the Sub-kernel Searching Module to (i) generate scene features corresponding to the training data and then generate the state vector corresponding to the scene features, through a Scene Overviewing Module (SOM) and (ii) generate the architecture information on the specific sub-kernel having the minimal kernel size and the minimal number of the channels suitable for performing the targeted task on the training data having the state vector under the constraint, through a Sub-kernel Network Generator (SNG).

15. The learning device of claim 14, wherein the processor performs or supports another device to perform (i) a process of training the Scene Overviewing Module and the Sub-kernel Network Generator under the constraint through back-propagation by using the first losses such that the first losses are minimized and (ii) a process of calculating one or more second losses by referring to the state vector and its corresponding ground truth and a process of training the Scene Overviewing Module by using the second losses such that the second losses are minimized.

16. The learning device of claim 14, wherein the Scene Overviewing Module is comprised of a CNN (Convolutional Neural Network) and wherein the Sub-kernel Network Generator is comprised of an RNN (Recurrent Neural Network), and
wherein the processor performs or supports another device to perform a process of training the Scene Overviewing Module and the Sub-kernel Network Generator separately or simultaneously.

17. The learning device of claim 16, wherein the processor performs or supports another device to perform a process of allowing the CNN in the Scene Overviewing Module to apply at least one convolution operation, at least one pooling operation, and at least one fully-connected operation to the training data, and thus to generate the scene features corresponding to the training data.

18. The learning device of claim 13, wherein, at the process of (II), the processor performs or supports another device to perform a process of optimizing the Big Neural Network Model by adjusting at least one of a kernel height, a kernel width, and the number of channels of the super kernel of the Big Neural Network Model in accordance with the architecture information on the specific sub-kernel, to thereby generate the specific Small Neural Network Model having the architecture information on the specific sub-kernel.

19. The learning device of claim 13, wherein, if a difference between the first inference result and the second inference result is determined as higher than a predetermined threshold, the processor performs or supports another device to perform a process of transmitting the training data and the architecture information on the specific Small Neural Network Model to the server, to thereby allow the server to set the training data as a hard sample to be used for the specific Small Neural Network Model and to add the hard sample to a training database.

20. An optimizing device for optimizing an on-device neural network model by using a Sub-kernel Searching Module (SSM), comprising:
at least one memory that stores instructions; and
at least one processor configured to execute the instructions to perform or support another device to perform: (I) on condition that (i) a Big Neural Network Model (B-NN Model), having a maximal capacity capable of performing a targeted task by using a maximal computing power allowed by an edge device on which a neural network model is to be mounted, has been trained to generate a first inference result on an input data fed thereinto and then a learning device has performed a process of inputting a training data into a Sub-kernel Searching Module (SSM), to thereby allow the Sub-kernel Searching Module to (i-1) identify at least one constraint for training corresponding to the training data wherein the constraint for training is imposed on at least part of a computational load, parameters, a latency, an accuracy, and flops, (i-2) generate a state vector for training corresponding to the training data wherein the state vector for training includes information on at least one of a degree of complexity of the training data and a degree of sharpness of the training data, and (i-3) generate architecture information for training on a specific sub-kernel for training having a minimal kernel size and a minimal number of channels suitable for performing the targeted task on the training data having the state vector for training under the constraint, wherein the specific sub-kernel for training is a subset of a super kernel corresponding to the maximal capacity of the Big Neural Network Model and is comprised of a kernel size equal to or less than that of the super kernel and the number of the channels in the kernel equal to or less than that in the super kernel, (ii) (ii-1) optimizing the Big Neural Network Model by referring to the architecture information for training on the specific sub-kernel for training, to thereby generate a specific Small Neural Network Model (S-NN Model) for training having the architecture information for training on the specific sub-kernel for training, from the Big Neural Network Model and (ii-2) allowing the specific Small Neural Network Model for training to generate a second inference result on the training data, and (iii) calculating one or more first losses by referring to the first inference result and the second inference result and training the Sub-kernel Searching Module by using the first losses, if a test data is acquired, a process of inputting the test data into the Sub-kernel Searching Module (SSM), to thereby allow the Sub-kernel Searching Module to (i) identify at least one constraint for testing corresponding to the test data wherein the constraint for testing is imposed on at least part of a computational load, parameters, a latency, an accuracy, and flops, (ii) generate a state vector for testing corresponding to the test data wherein the state vector for testing includes information on at least one of a degree of complexity of the test data and a degree of sharpness of the test data, and (iii) generate architecture information for testing on a specific sub-kernel for testing having a minimal kernel size and a minimal number of channels suitable for performing the targeted task on the test data having the state vector for testing under the constraint for testing, wherein the specific sub-kernel for testing is a subset of the super kernel corresponding to the maximal capacity of the Big Neural Network Model and is comprised of a kernel size equal to or less than that of the super kernel and the number of the channels in the kernel equal to or less than that in the super kernel, and (II) a process of (i) optimizing the Big Neural Network Model by referring to the architecture information for testing on the specific sub-kernel for testing, to thereby generate a specific Small Neural Network Model (S-NN Model) for testing having the architecture information for testing on the specific sub-kernel for testing, from the Big Neural Network Model and (ii) allowing the specific Small Neural Network Model for testing to generate a third inference result on the test data.

21. The optimizing device of claim 20, wherein, at the process of (I), the processor performs or supports another device to perform a process of allowing the Sub-kernel Searching Module to (i) generate scene features for testing corresponding to the test data and then generate the state vector for testing corresponding to the scene features for testing, through the Scene Overviewing Module (SOM) and (ii) generate the architecture information for testing on the specific sub-kernel for testing having the minimal kernel size and the minimal number of the channels suitable for performing the targeted task on the test data having the state vector for testing under the constraint for testing, through the Sub-kernel Network Generator (SNG).

22. The optimizing device of claim 21, wherein the Scene Overviewing Module is comprised of a CNN (Convolutional Neural Network) and wherein the Sub-kernel Network Generator is comprised of an RNN (Recurrent Neural Network).

23. The optimizing device of claim 22, wherein the processor performs or supports another device to perform a process of allowing the CNN in the Scene Overviewing Module to apply at least one convolution operation, at least one pooling operation, and at least one fully-connected operation to the test data, and thus to generate the scene features for testing corresponding to the test data.

24. The optimizing device of claim 20, wherein, at the process of (II), the processor performs or supports another device to perform a process of optimizing the Big Neural Network Model by adjusting at least one of a kernel height, a kernel width, and the number of channels of the super kernel of the Big Neural Network Model in accordance with the architecture information for testing on the specific sub-kernel for testing, to thereby generate the specific Small Neural Network Model for testing having the architecture information for testing on the specific sub-kernel for testing.

* * * * *